DELAY LINE BUFFER STORAGE CIRCUIT

Filed Sept. 16, 1965

INVENTORS
JOHN L. BOTJER
EDWARD O. DONNER
HAROLD E. FRYE
HOWARD S. KEELER

BY *Thomas & Thomas* ATTORNEYS 3,413,615
Patented Nov. 26, 1968

3,413,615

DELAY LINE BUFFER STORAGE CIRCUIT

John L. Botjer, Hyde Park, Edward O. Donner, Poughkeepsie, and Harold E. Frye and Howard S. Keeler, Wappingers Falls, N.Y., assignors to International Business Machines Corporation, Armonk, N.Y., a corporation of New York Filed Sept. 16, 1965, Ser. No. 487,887
2 Claims. (Cl. 340—173)

ABSTRACT OF THE DISCLOSURE

A buffer storage arrangement uses a pair of delay lines connected in parallel to increase the overall bandwidth, and a clock operates And circuits at the input end and the output end of each delay line, the buffer including provision for supplying all signals emanating from the delay lines to a load device and to a feedback circuit for reentry. Signals in the delay lines are recirculated through the feedback path except when new intelligence signals are substituted, at which time the feedback path is rendered inoperative under the supervision of a control device.

This invention relates to cyclical type buffer storage circuits and more particularly to such cyclical buffer storage circuits utilizing delay lines.

Cyclical buffer storage circuits are used in a wide variety of applications, and they are particularly well suited for use in a cathode ray tube type display where video signals must be stored and repetitively supplied to the display tube. One problem encountered is that of obtaining sufficient band width for the video signals without undue complexity and a resultant increase in cost.

It is a feature of this invention to provide an improved delay line buffer storage arrangement which is simple in construction, reliable in operation and inexpensive to manufacture and maintain, yet provide adequate band width for the signal frequencies or pulse repetition rates involved.

There is provided according to this invention an improved circuit which includes delay line buffer storage of limited band width for making data signals reptitively available at a greater band width. An input channel having a frequency or pulse repetition rate F is connected sequentially to the input of two or more delay line buffer storage devices N in turn, where N represents the number of such delay line buffer storage devices. The frequency or pulse repetition rate through the individual delay line buffer storage devices is thus $F/N$. The greater band width of the input channel may be matched by using as many delay line buffer storage devices of limited band width as required. The number of such delay line buffer storage devices used is a function of the band width of the individual delay line buffer storage devices. The signals stored in a given delay line buffer storage device may be recirculated as long as required. The outputs of the delay line buffer storage devices may be mixed by sampling each of the outputs sequentially. The outputs thus sampled have a frequency or pulse repetition rate F, and these signals may be supplied to a load device each time they are recirculated.

The foregoing and other objects, features and advantages of the invention will be apparent from the following more particular description of a preferred embodiment of the invention, as illustrated in the accompanying drawings.

Figure 1:
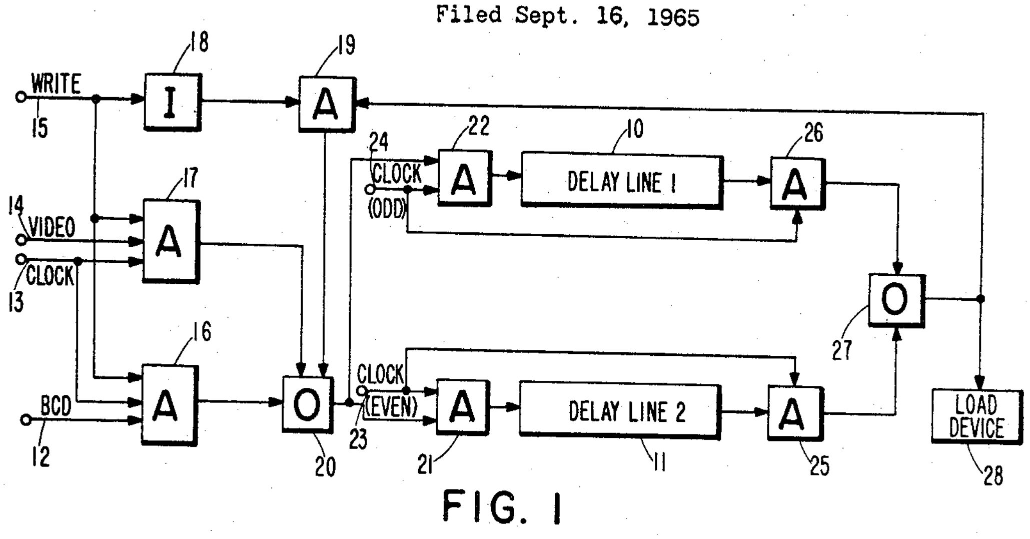
FIGURE 1 illustrates one embodiment according to this invention.

In the ensuing description it is arbitrarily assumed that the logical circuits illustrated in FIGURE 1 employ positive logic. That is, the logical circuits are operated by positive signals, and they are deactivated by negative signals. The terms positive and negative are relative, not absolute within the context. It is to be understood that in practice a logical circuit may in fact be deactivated by a positive signal and activated by a more positive signal. Alternatively, a logical circuit may be activated by a negative signal and deactivated by a more negative signal. The arbitrary use of the terms positive and negative for respectively activating and deactivating the logical circuits in FIGURE 1 is done for convenience.

Referring to FIGURE 1 of the drawing, delay lines 10 and 11 are labeled respectively Delay Line 1 and Delay Line 2. The invention is illustrated with two delay lines, but it readily follows from this description that additional delay lines may be employed. Information or data signals for the delay lines is supplied to either input line 12 or 14. Data signals of the binary coded decimal type are supplied on the input line 12, and video data signals are supplied on the input line 14. Clock signals are supplied continuously on an input line 13. Control signals are applied to an input line 15 to control the writing or entry of video data signals or binary coded decimal signals to the delay lines. Binary coded decimal data signals are passed by an And circuit 16, and video data signals are passed by an And circuit 17. These data signals are passed only when the input line 15 is energized with a positive signal level which energization signifies that a write operation may take place. Signals on the write line 15 are inverted by an inverter 18; and the output therefrom is supplied to an And circuit 19. The And circuit 19 is deactivated whenever the write line 15 is energized with a positive signal level to permit a write operaiton to take place. Data signals from the And circuits 16 and 17 are supplied through an Or circuit 20 to And circuits 21 and 22. A clock pulse generator, not shown, supplies clock pulses continuously to the input line 13. Alternate clock pulses, designated even numbered clock pulses, are supplied to a line 23 which is connected to the And circuit 21, and the remaining clock pulses, designated odd numbered clock pulses, are supplied to a line 24 which is connected to the And circuit 22. The even and odd clock pulses energize the And circuits 21 and 22 in an alternate fashion, and this permits the binary code decimal or the video data signals from the Or circuit 20 to be supplied alternately through the And circuits 21 and 22 to the associated delay lines 10 and 11.

Data signals supplied to the delay lines 1 and 2 are delayed a specified length of time which is determined by the length of these delay lines. Signals emanating from the delay lines 1 and 2 are supplied to associate And circuits 25 and 26. The And circuit 26 is controlled by the odd clock pulses applied to the line 24, and the And circuit 25 is controlled by the even clock pulses applied to the line 23. The output from the And circuit 25 and the output of the And circuit 26 pass through an Or circuit 27 to a load device 28. The output of the Or circuit 27 is also applied to the And circuit 19 which is conditioned to pass these signals to the Or circuit 20 and to the input of the delay lines 1 and 2 except when a write operation is taking place. Thus it is seen that information once supplied to the delay lines 1 and 2 continues to recirculate until interrupted. If a write operation takes place, old data signals are replaced by new data signals if the old data signals are emanating from the delay lines.

Figure 2:
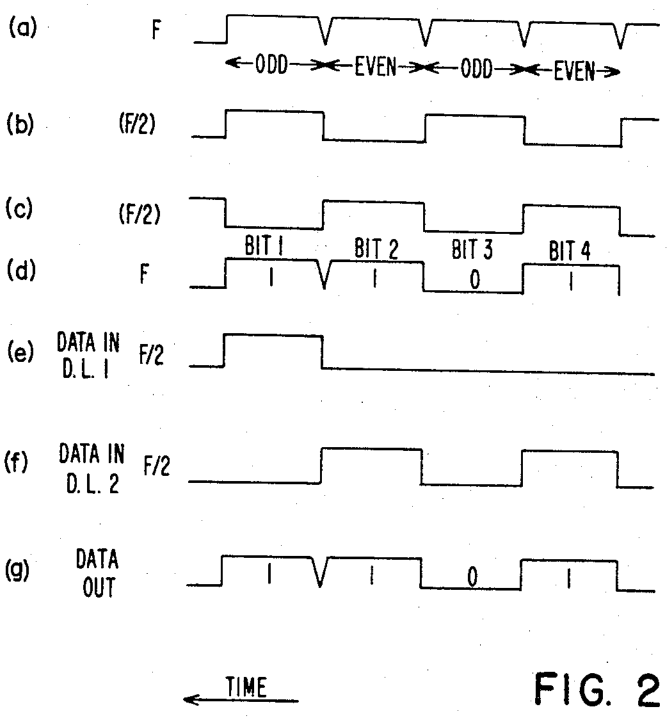
FIGURE 2 illustrates a timing diagram which is helpful in understanding the operation of the embodiment of FIGURE 1.

Reference is made to FIGURE 2 for a description of the timing relationships involved. FIGURE 2($a$) shows clock pulses which occur at a pulse repetition rate of F, and they are applied to the input line 13 in FIGURE 1. The odd clock pulses in FIGURE 2($a$) are applied to the line 24 in FIGURE 1, and they are depicted in FIGURE 2(*b*) as having a pulse repetition rate of $F/2$. The even clock pulses in FIGURE 2(*a*) are depicted in FIGURE 2(*c*) as having a pulse repetition rate $F/2$, and they are applied to the line 23 in FIGURE 1. The odd and even clock pulses control the switching operations of data signals into the delay lines 1 and 2 as well as the switching operations for mixing the data signals emanating from the delay lines 1 and 2. That is, the clock pulses condition the And circuits 22 and 26 which thus permit new data signals to be supplied to the delay line 1 through the And circuit 22, and at the same time data signals emanating from the delay line 1 may be supplied through the AND circuit 26 and the Or circuit 27 to a load device 28. Any data signals passing from the delay line 1 are not permitted to recirculate if a write operation is taking place. More specifically, reentry into the delay line 1 is prevented by the And circuit 19 which is deconditioned if a write operation is in process. During even clock pulses the And circuits 22 and 26 are de-energized, and the delay line 1 neither receives nor supplies data signals therefrom. When even clock pulses are supplied on the line 23 FIGURE 1, the And circuit 21 is conditioned to permit the passage of new data signals to the delay line 2, and the And circuit 25 is conditioned to pass data signals emanating from the delay line 2. When an even clock pulse is supplied to the line 23, any information signal emanating from the delay line 2 is passed through the Or circuit 27 to the And circuit 19. If no write operation is taking place, the signal supplied to the And circuit 19 is passed through the Or circuit 20 and the And circuit 21 to the input of the delay line 2, thereby permitting reentry of the data signal taken from the delay line 2. If a write operation is taking place at the time a data signal from the delay line 2 is supplied to the And circuit 19, re-entry of this data signal is inhibited by the output of the inverter 18, and a new data signal from either the And circuit 16 or the And circuit 17 is permitted to pass through the Or circuit 20 and the And circuit 21 to the input side of the delay line 2. It is pointed out that the data rate through the delay line 1 is $F/2$ with the data signals occurring during the times of the odd clock pulses. The delay line 2 has a data rate of $F/2$ with the data signals occurring during the even clock pulses. The delay lines 1 and 2 have the same length or period of delay. The delay line 1 may have a delay equal to any multiple of the period of the odd clock pulses, and the delay line 2 has the same length or period of delay.

Let it be assumed for purposes of illustration that a binary coded decimal number illustrated in FIGURE 2(*d*) is supplied to the input line 12 in FIGURE 1. It is arbitrarily assumed that a binary 1 is represented by a positive pulse, and a binary 0 is represented by the absence of a pulse or ground signal level. As illustrated in FIGURE 2(*d*), bit one of the wave train applied to the line 12 in FIGURE 1 is a binary one, and it occurs during an odd clock pulse. Let it be assumed further that a positive signal is supplied to the write line 15 in FIGURE 1 during the period that the wave train is being applied to the line 12. Accordingly, bit 1 in FIGURE 2(*d*) passes through the And circuit 16 in FIGURE 1, the Or circuit 20 and the And circuit 22 to the input side of the delay line 1. Bit 2 of the wave train in FIGURE 2(*d*) occurs during an even clock pulse, and it is supplied through the And circuit 16 in FIGURE 1, the Or circuit 20 and the And circuit 21 to the input side of the delay line 11. Bit 3 of the wave train is a binary 0 which occurs during an odd clock pulse, and it is supplied through the And circuit 16, the Or circuit 20 and the And circuit 22 to the input side of the delay line 1. Bit 4 of the wave train is a binary 1 which occurs during an even clock pulse, and it is supplied through the And circuit 16, the Or circuit 20 and the And circuit 21 to the input side of the delay line 2. FIGURE 2(*e*) shows the data signals entered into the delay line 1, and FIGURE 2(*f*) shows the data signals entered into the delay line 2. As soon as these signals pass through the delay lines 1 and 2 and emanate from the output side, they are again mixed into a wave train as shown in FIGURE 2(*g*). The signals in the wave train FIGURE 2(*g*) are applied to a load device 28, and they are passed by the And circuit 19 and the Or circuit 20 to the And circuits 21 and 22 where they are again separated and applied alternately to the input sides of the delay lines 1 and 2 as before.

Thus it is seen that a novel circuit arrangement is provided which utilizes two delay lines of limited band width to store and retain a wave train of much greater band width. While the invention has been illustrated with the use of two delay lines, it is readily apparent that additional band width may be obtained by using a greater number of delay lines and dividing the clock pulses accordingly. For example if three delay lines are employed, each delay line receives every third clock pulse.

While the invention has been particularly shown and described with reference to a preferred embodiment thereof, it will be understood by those skilled in the art that the foregoing and other changes in form and details be made therein without departing from the spirit and scope of the invention.

What is claimed is:

1. An improved serial storage system for storing and reproducing intelligence in serial pulse form characterized by an input signal bandwidth and an output signal bandwidth each of which exceeds the bandwidth of the individual delay lines used for storage purposes, such storage system including:

first and second delay lines, a first And circuit connected to one end of said first delay line, a second And circuit connected to one end of said second delay line, a first Or circuit connected to said first and second And circuits, a source of intelligence signals connected to said first Or circuit, said source of intelligence signals consisting of pulses in serial form, a third And circuit connected to the other end of said first delay line, a fourth And circuit connected to the other end of said second delay line, a second Or circuit, said third and fourth And circuits being connected to said second Or circuit, a load device, said second Or circuit being connected to said load device, a fifth And circuit connected between said first and second Or circuits, a clock which provides a source of control pulses, means connecting alternate clock pulses to said first and third And circuits, thereby to control the time at which said first and third And circuits are operated, means connecting the remaining clock pulses to said second and fourth And circuits, thereby to control the time by which said second and fourth And circuits are operated, said source of intelligence signals including sixth and seventh And circuits connected to said first Or circuit, and means for connecting first data signals to said sixth And circuit and second data signals to said seventh And circuits, means connecting said clock to said sixth and seventh And circuits whereby all clock pulses are applied to each of said sixth and seventh And circuits, an inverter circuit connected to said fifth And circuit, and means connecting a control signal to said inverter circuit, and sixth And circuit, and said seventh And circuit.

whereby all signals emanating from the first and second delay lines are supplied to said load device, and they are permitted to recirculate through fifth AND circuit and said first and second delay lines and be repetitively applied to said load device except when signals from said source of intelligence are inserted into said first and second delay lines through said sixth and seventh And circuits at which time such inserted signals replace any corresponding recirculating signals earlier inserted.

2. The apparatus of claim 1 wherein said means connecting a control signal to said inverter circuit conveys a signal of one polarity to operate said fifth And circuit and a signal of opposite polarity to operate said sixth and seventh And circuits.

References Cited

UNITED STATES PATENTS

| | | | |
|---|---|---|---|
| 3,156,896 | 11/1964 | Martin | 340—172.5 |
| 3,074,048 | 1/1963 | Turner | 333—30 |
| 2,978,680 | 4/1961 | Schulte | 340—172.5 |
| 2,876,352 | 3/1959 | Schneider | 340—173 |
| 2,694,748 | 11/1954 | Johnson | 179—100.2 |

TERRELL W. FEARS, *Primary Examiner.*